United States Patent
Pursifull et al.

(10) Patent No.: US 9,453,469 B2
(45) Date of Patent: Sep. 27, 2016

(54) METHOD AND SYSTEM FOR ADJUSTING ENGINE THROTTLES

(75) Inventors: Ross Dykstra Pursifull, Dearborn, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 815 days.

(21) Appl. No.: 13/483,670

(22) Filed: May 30, 2012

(65) Prior Publication Data

US 2013/0319371 A1    Dec. 5, 2013

(51) Int. Cl.
*F02D 41/26*   (2006.01)
*F02D 41/00*   (2006.01)
F02D 11/10    (2006.01)

(52) U.S. Cl.
CPC .......... *F02D 41/0002* (2013.01); *F02D 41/008* (2013.01); *F02D 11/10* (2013.01); *F02D 2200/0406* (2013.01); *Y02T 10/42* (2013.01)

(58) Field of Classification Search
CPC ................ F02D 2200/0406; F02D 41/0002; F02D 11/10; F02D 9/02; F02D 9/109; F02D 9/1095; Y02T 10/42; F02B 2031/003; F02B 2075/1812; F02B 27/0266; F02B 27/0273; F02B 27/0278
USPC .......... 123/395, 399, 336, 337, 403, 184.56, 123/442
See application file for complete search history.

(56) References Cited

U.S. PATENT DOCUMENTS

| | | | |
|---|---|---|---|
| 5,054,439 A | | 10/1991 | Akagi et al. |
| 5,063,899 A | * | 11/1991 | Hitomi et al. ............... 123/336 |
| 5,168,954 A | | 12/1992 | Nakaniwa et al. |
| 5,649,512 A | * | 7/1997 | Flanery et al. .......... 123/339.23 |
| 5,823,163 A | | 10/1998 | Hoshi |
| 5,970,948 A | | 10/1999 | Yasuoka |
| 6,895,927 B2 | | 5/2005 | Fuwa |
| 8,176,894 B2 | | 5/2012 | Ulrey et al. |
| 2006/0064228 A1 | * | 3/2006 | Huang ............... F02D 41/0002 701/104 |
| 2010/0242877 A1 | | 9/2010 | Shiomi et al. |
| 2012/0024261 A1 | * | 2/2012 | Ulrey et al. ................. 123/336 |
| 2013/0066535 A1 | * | 3/2013 | Leone et al. .................. 701/103 |
| 2013/0318966 A1 | * | 12/2013 | Leone et al. ................... 60/611 |
| 2014/0137839 A1 | * | 5/2014 | Russ ............................ 123/337 |

OTHER PUBLICATIONS

Leone, Thomas G. et al., "Method and System for Improving Engine Starting," U.S. Appl. No. 13/326,150, filed Dec. 14, 2011, 48 pages.
Leone, Thomas G. et al., "Method and System for Adjusting Engine Throttles," U.S. Appl. No. 13/483,612, filed May 30, 2012, 28 pages.

\* cited by examiner

*Primary Examiner* — Hai Huynh
*Assistant Examiner* — Gonzalo Laguarda
(74) *Attorney, Agent, or Firm* — Julia Voutyras; Alleman Hall McCoy Russell & Tuttle LLP

(57) ABSTRACT

An engine system and method for operating an engine including a central throttle and a port throttle is disclosed. In one example, the central throttle and port throttle are adjusted to improve transitions between throttle control modes. The approach may be particularly beneficial for turbocharged engines.

12 Claims, 6 Drawing Sheets

METHOD AND SYSTEM FOR ADJUSTING ENGINE THROTTLES

BACKGROUND/SUMMARY

Engine performance and efficiency engine may be improved by combining a central throttle with port throttles. The central throttle regulates air flow into a plurality of cylinders while each port throttle regulates air flow into a single cylinder. In one example, a central throttle may be positioned in an engine air intake system upstream of an engine air intake manifold that routes air from the central throttle to engine cylinders. Intake manifold runners direct air from the intake manifold to intake ports. A port throttle positioned within each intake port leading to a cylinder, or alternatively within each intake manifold runner, regulates air flow into an individual engine cylinder. However, it may be difficult to cooperatively control port throttles with a central throttle. For example, during higher load conditions, it may be desirable to fully open port throttles to improve cylinder air flow. At lower engine loads, it may be desirable to control air flow into engine cylinders at least in part via the port throttles. Therefore, it may be difficult to provide a desired cylinder air amount when transitioning between conditions where port throttle position affects cylinder air amount and conditions where port throttle position has little or no effect on cylinder air amount.

The inventors herein have recognized the above-mentioned limitations and have developed an engine operating method, comprising: providing a transition from a first throttle control mode to a second throttle control mode in response to a change in engine operating conditions; and adjusting intake manifold pressure via a first throttle responsive to a desired cylinder air charge in the first throttle control mode and adjusting intake port pressure via a second throttle responsive to the desired cylinder air charge in the second throttle control mode.

By adjusting intake manifold pressure and/or intake port pressure depending on operating conditions during transitions between throttle control modes, it may be possible to provide a desired cylinder air charge. For example, if a driver requests a change from a higher brake mean effective pressure (BMEP) to a lower BMEP, the throttle control mode may be changed to improve engine efficiency and/or performance. Cylinder air charge may be adjusted and quickly converged to a desired cylinder air charge by changing intake port pressure via a port throttle. The intake manifold pressure may be allowed to evolve at a different rate by closing the central throttle differently than the port throttle. In other examples, the port throttle may be maintained in a substantially fully open position (e.g., within 10% of full open) while intake manifold pressure is adjusted via a central throttle to provide the desired cylinder air charge. In this way, the desired cylinder air charge may be provided by selectively controlling the intake manifold pressure and/or intake port pressure to provide the desired cylinder air charge.

The present description may provide several advantages. Specifically, the approach may provide improved transient air flow control when switching between throttle control modes. Further, the approach may provide improved cylinder air-fuel control at lower engine loads, thereby improving engine emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
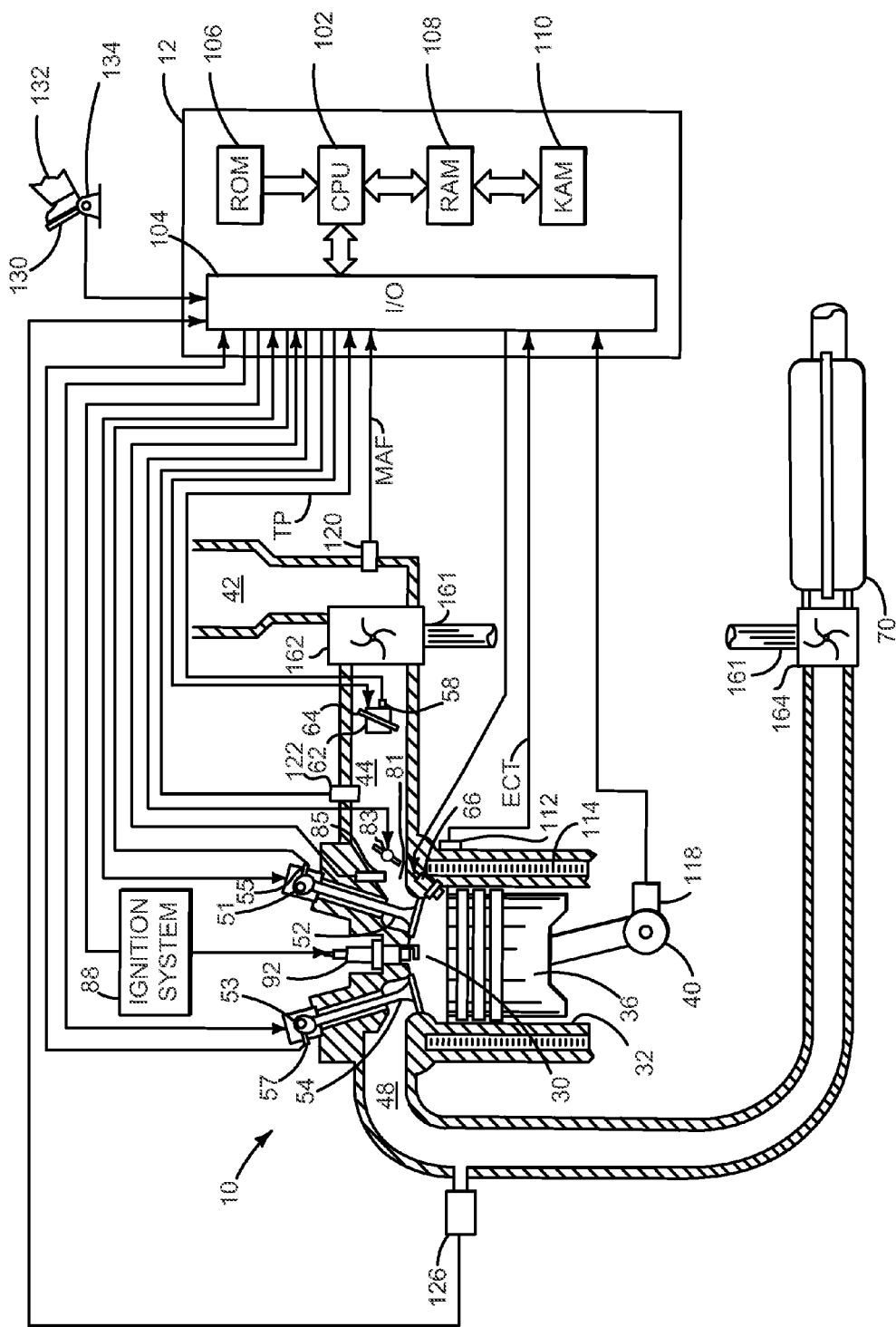
FIG. 1 shows a schematic depiction of an engine.

The present description is related to controlling port throttles of an engine as shown in the example of FIG. 1. In one example, a central throttle and port throttles are adjusted to provide improved transitioning between different throttle control modes. Central and port throttles may be controlled according to the method of FIG. 6 to transition between throttle control modes described in the engine map of FIG. 2 to provide the operating sequences illustrated in FIGS. 3-5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided by controller 12. Fuel is delivered to fuel injector 66 by a fuel system (not shown) including a fuel tank, fuel pump, and fuel rail (not shown).

Intake manifold 44 is supplied air by compressor 162. Exhaust gases rotate turbine 164 which is coupled to shaft 161, thereby driving compressor 162. In some examples, a bypass passage is included so that exhaust gases may bypass turbine 164 during selected operating conditions. Further, a compressor bypass passage may be provided in some examples to limit pressure provided by compressor 162.

In addition, intake manifold 44 is shown communicating with central throttle 62 which adjusts a position of throttle plate 64 to control air flow from engine air intake 42. Central throttle 62 may be electrically operated. Port throttle 83 controls air flow into cylinder 30 via restricting or opening intake port 81. In engines with a plurality of cylinders a plurality of individually controlled port throttles may be provided so that port throttle of a first cylinder may be positioned differently from port throttles of another cylinder.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold absolute pressure (MAP) from pressure sensor 122 coupled to intake manifold 44; a measurement of cylinder absolute port pressure from sensor 85; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Figure 2:
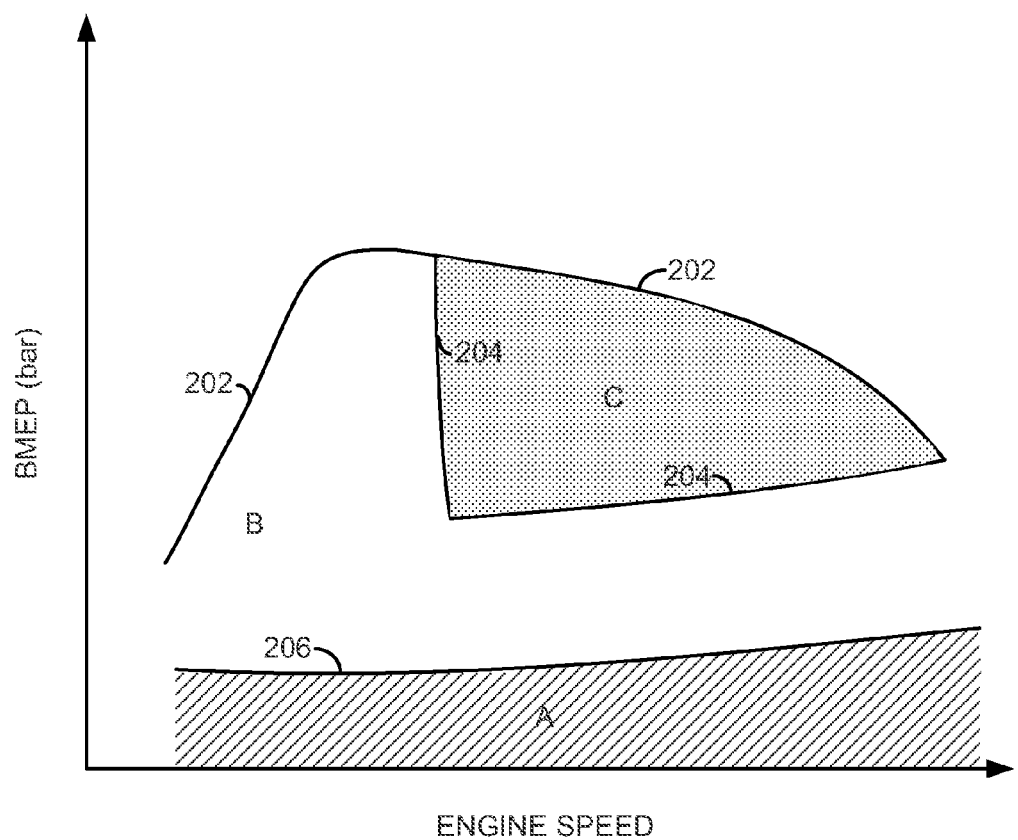
FIG. 2 shows an example engine operating mode map.

Referring now to FIG. 2, an example engine operating mode map is shown. The map includes an X-axis labeled engine speed and a Y-axis labeled brake mean effective pressure (BMEP). BMEP increases in the direction of the Y-axis arrow. Engine speed increases in the direction of the X-axis arrow.

Region A is shown as a shaded area that lies below curve 206. Region A is a low engine load region where air flow maldistribution between engine cylinders may occur when port throttles are opened a small amount to limit cylinder air charge. Maldistribution may result from clearance differences between port throttles and intake ports or other tolerances such as small differences in port throttle angle. Therefore, in region A, port throttles are opened to an extent where a larger pressure drop occurs across the central throttle than a port throttle during an intake stroke of a cylinder receiving air via the port throttle. Region A may be characterized as a first throttle control mode where a larger pressure drop occurs across the central throttle than the port throttle.

Region B is an unshaded area that lies above curve 206 and below curves 202 and 204. Region B is a medium engine load region that extends to higher engine loads at lower engine speeds. In region B, port throttles are opened to an extent where a smaller pressure drop occurs across the central throttle than a port throttle during an intake stroke of a cylinder receiving air via the port throttle. Such throttle adjustments provide for lower engine pumping work and improved transient engine response since intake manifold pressure is increased toward or above atmospheric pressure. Region B may be characterized as a second throttle control mode where a larger pressure drop occurs across the port throttle than the central throttle.

Region C is shown as a shaded area that lies below curve 202 and above curve 204. Region C is a high engine speed and load region where port throttles are opened a large amount to allow increased air flow into cylinders. Air flow to engine cylinders is controlled via the central throttle. In particular, a port throttle is opened to an extent where a greater pressure drop occurs across the central throttle than the port throttle. Region C may be characterized as a third throttle control mode where a larger pressure drop occurs across the central throttle than the port throttle.

Figure 3:
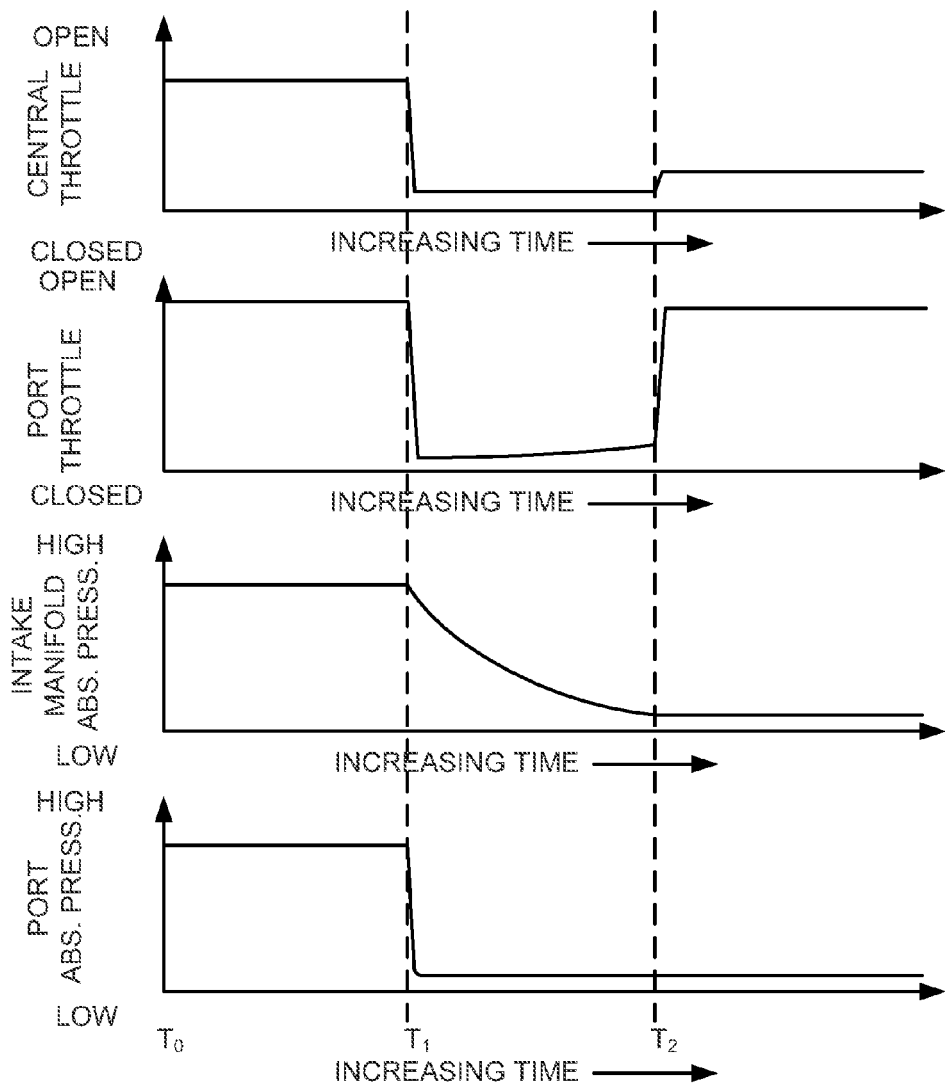
FIGS. 3-5 show simulated examples of an engine operating sequences.

Referring now to FIG. 3, a simulated example engine operating sequence is shown. The sequence of FIG. 3 may be provided by the system of FIG. 1 executing the method of FIG. 6. Vertical markers at time $T_1$ and $T_2$ provide reference points to events of interest in the sequence.

The first plot from the top of FIG. 3 represents central throttle opening amount versus time. The Y-axis represents central throttle opening amount and central throttle opening amount increases in the direction of the Y-axis arrow. The X-axis represents time and time increases from the left side of the plot to the right side of the plot.

The second plot from the top of FIG. 3 represents port throttle opening amount versus time. The Y-axis represents port throttle opening amount and port throttle opening amount increases in the direction of the Y-axis arrow. The X-axis represents time and time increases from the left side of the plot to the right side of the plot.

The third plot from the top of FIG. 3 represents engine intake manifold absolute pressure versus time. The Y-axis represents engine intake manifold absolute pressure and engine intake manifold pressure increases in the direction of the Y-axis arrow. The X-axis represents time and time increases from the left side of the plot to the right side of the plot.

The fourth plot from the top of FIG. 3 represents intake port absolute pressure. The Y-axis represents intake port absolute pressure and intake port absolute pressure increases in the direction of the Y-axis arrow. The X-axis represents time and time increases from the left side of the plot to the right side of the plot.

At time $T_0$, the engine is operated in a first throttle control mode where BMEP is controlled via the central throttle (e.g., region C of FIG. 2; central throttle in control of cylinder air charge). A higher pressure drop occurs across the central throttle than the port throttle since the port throttle is substantially fully open (e.g., greater than 90% open). In this throttle mode, the central throttle opening amount may be increased to increase cylinder air charge (e.g., the amount of air entering a cylinder during a cycle of the cylinder) or decreased to decrease cylinder air charge. The port throttle is positioned to have no effect on cylinder air charge. Intake manifold pressure is at a relatively high value since the central throttle is opened to a larger amount. Likewise, intake port pressure is at a higher value and substantially follows intake manifold pressure since very little pressure drop occurs across the port throttle during this throttle control mode.

At time $T_1$, the central throttle opening area is reduced in response to a change in desired engine torque or BMEP. The central throttle opening area is reduced to an amount that is lower or less than the opening amount applied to provide the requested steady state BMEP after the throttle mode change transition is completed after time $T_2$. In this way, the central throttle can help to reduce intake manifold pressure at an increased rate by limiting air flow into the intake manifold. In other words, the central throttle opening amount overshoots the central throttle opening amount at the steady state requested BMEP.

The port throttle opening amount is also reduced so that a pressure drop across the port throttle is greater than a pressure drop across the central throttle during the transition from the first throttle control mode to the second throttle control mode. The port throttle is controlled to provide a desired intake port pressure that provides a desired cylinder air charge. In one example, the intake port pressure in adjusted via the port throttle according to the ideal gas law PV=nRT, where P is the intake port pressure, V is the cylinder volume, n is the number of moles of air, R is the universal gas constant, and T is the air charge temperature in degrees Kelvin.

The intake manifold pressure begins to be reduced shortly after the central throttle opening amount is reduced. The intake manifold pressure is reduced via cylinders removing air from the intake manifold and less air entering the intake manifold via the central throttle. The intake port pressure also is reduced at time $T_1$; however, the intake port pressure is reduced at a much faster rate than the intake manifold pressure since the intake port volume is much smaller than the engine intake manifold volume.

Figure 4:
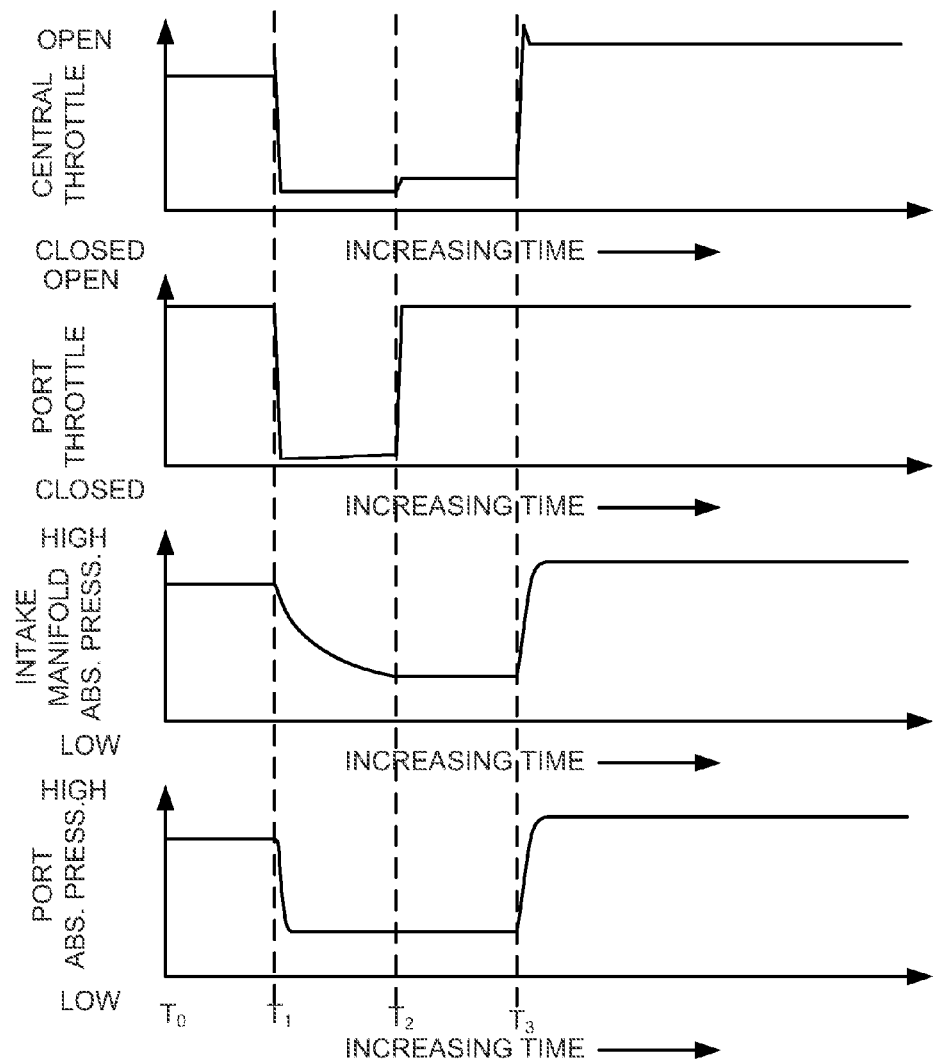
Figure 5:
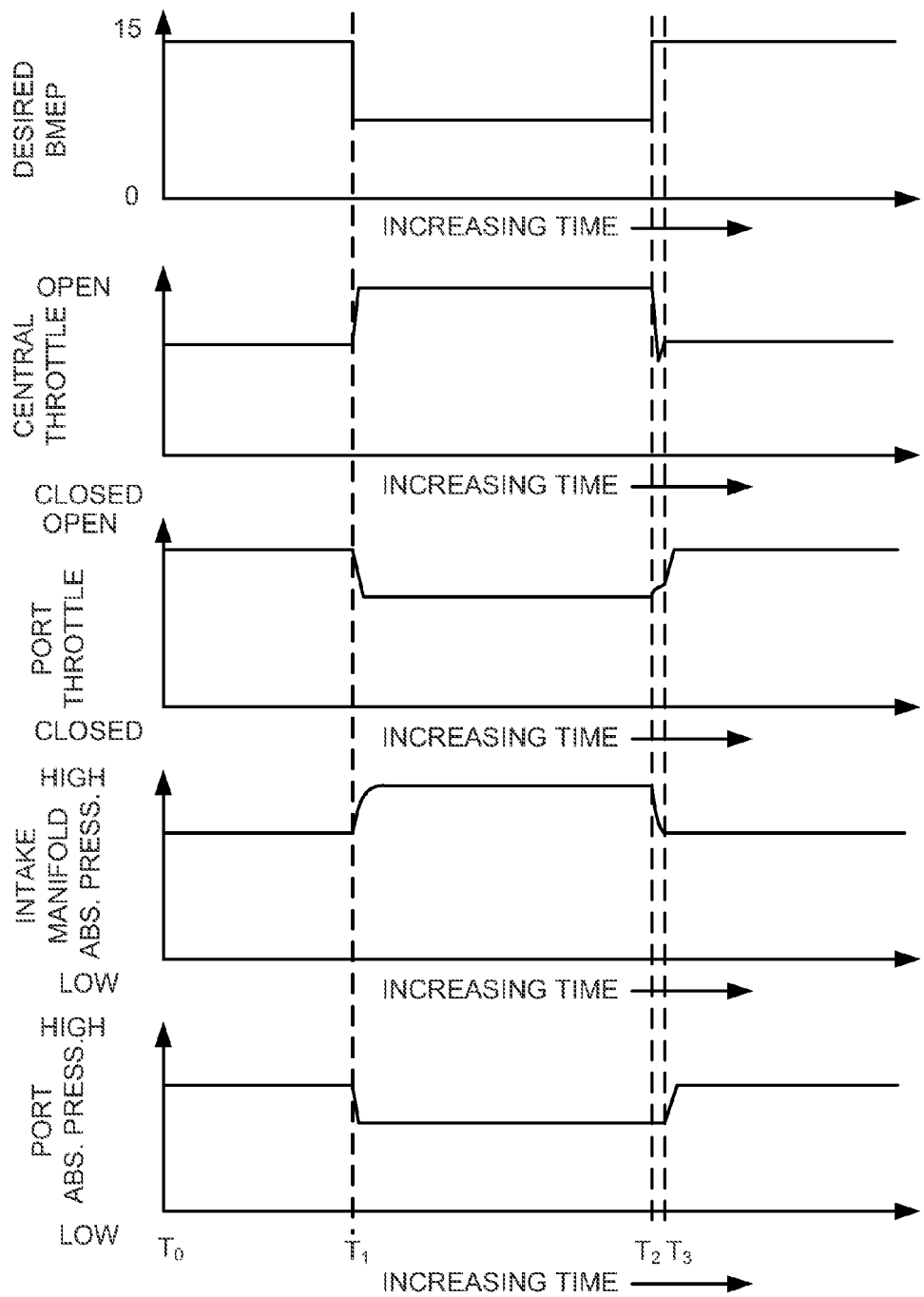

It should be noted that in practice, the intake port pressure is the cylinder pressure at the time of intake valve closing and is therefore not a continuous amount as shown in FIGS. 3-5.

Between time $T_1$ and time $T_2$, the intake manifold pressure continues to decay or be reduced and the intake port pressure is at a level requested by the driver (e.g., BMEP may be requested by the driver via accelerator pedal 130). The port throttle opening amount is increased slightly to maintain the desired BMEP even though intake pressure is decaying.

At time $T_2$, the intake manifold pressure reaches a desired value and the central throttle is opened to a steady state opening amount that provides the desired BMEP. The port throttle is also commanded to a substantially fully open position. The central throttle controls the air charge since the port throttle is substantially open. The intake port pressure and intake manifold pressure are substantially the same (e.g., within ±0.069 bar) pressure. Cylinder air charge is controlled primarily by the central throttle. Region A of FIG. 2 is representative of the engine operating conditions after time $T_2$ (e.g., central throttle is in control of cylinder air charge). Thus, FIG. 3 represents a change from a higher BMEP engine operating condition to a lower BMEP engine operating condition where the central and port throttles are controlled in a first mode at the higher BMEP and where the central and port throttles are controlled in a second mode at the lower BMEP. The port throttle and the central throttle are controlled in response to the intake manifold pressure before time $T_1$. In particular, during the conditions before time $T_1$ intake manifold pressure is high, and because intake manifold pressure cannot be reduced immediately since its volume is rather large, the port throttle opening amount is reduced to provide the desired cylinder air charge.

Referring now to FIG. 4, a simulated example engine operating sequence is shown. The sequence of FIG. 4 may be provided by the system of FIG. 1 executing the method of FIG. 6. Vertical markers at time $T_1$-$T_3$ provide reference points to events of interest in the sequence.

The four plots of FIG. 4 represent the same parameters as are described in FIG. 3. Therefore, for the sake of brevity, only the differences between the plots are described below.

At time $T_0$, the engine is operated in a first throttle control mode where BMEP is controlled via the central throttle (e.g., region C of FIG. 2; central throttle in control of cylinder air charge). A higher pressure drop occurs across the central throttle than the port throttle since the port throttle is substantially fully open. In this throttle mode, the central throttle opening amount may be increased to increase cylinder air charge or decreased to decrease cylinder air charge. The port throttle is positioned with a large opening amount to have no effect on cylinder air charge. Intake manifold pressure is at a relatively high value since the central throttle is opened to a larger amount. Likewise, intake port pressure is at a higher value and substantially follows intake manifold pressure since very little pressure drop occurs across the port throttle during this throttle control mode.

At time $T_1$, the central throttle opening area is reduced in response to a change in desired engine torque or BMEP. The central throttle opening area is reduced to an amount that is lower or less than the opening amount applied to provide the requested steady state BMEP after the throttle mode change transition is completed after time $T_2$. In this way, the central throttle can help to reduce intake manifold pressure at an increased rate by limiting air flow into the intake manifold. In other words, the central throttle opening amount overshoots the central throttle opening amount at the steady state requested BMEP.

The port throttle opening amount is also reduced so that a pressure drop across the port throttle is greater than a pressure drop across the central throttle during the transition from the first throttle control mode to the second throttle control mode. The port throttle is controlled to provide a desired intake port pressure that provides a desired cylinder air charge.

The intake manifold pressure begins to be reduced shortly after the central throttle opening amount is reduced. The intake manifold pressure is reduced via cylinders removing air from the intake manifold and less air entering the intake manifold via the central throttle. The intake port pressure is reduced at a much faster rate than the intake manifold pressure since the intake port volume is much smaller than the engine intake manifold volume.

Between time $T_1$ and time $T_2$, the intake manifold pressure continues to decay or be reduced and the intake port pressure is at a level requested by the driver. The port throttle opening amount is increased slightly to maintain the desired BMEP even though intake pressure is decaying.

At time $T_2$, the intake manifold pressure reaches a desired value and the central throttle is opened to a steady state opening amount that provides the desired BMEP. The port throttle is also commanded to a substantially fully open position. The central throttle controls the air charge since the port throttle is substantially open. The intake port pressure and intake manifold pressure are substantially the same pressure. Cylinder air charge is controlled primarily by the central throttle. Region A of FIG. 2 is representative of the engine operating conditions after time $T_2$ (e.g., central throttle is in control of cylinder air charge) and before time $T_3$.

At time $T_3$, a request for a change to increase BMEP occurs and the central throttle opening amount is increased to comply with the request for higher BMEP. The central throttle is opened by an amount that is greater than the steady state central throttle opening amount applied to provide the desired BMEP after time $T_3$. In other words, the central throttle opening amount overshoots the steady state central throttle opening amount that provides the desired BMEP after the change in BMEP request. By overshooting the steady state central throttle opening amount, the intake manifold can fill with air at an increased rate. The port throttle positioned is maintained at a substantially fully open position so that a greater pressure drop occurs across the central throttle than across the port throttle. The throttle mode after time $T_3$ is representative of the throttle control mode in Region C of FIG. 2.

The intake manifold pressure rises at a quick rate after the central throttle is commanded open. The intake port pressure also rises at a quick rate as the central throttle is opened. Thus, during and after the throttle mode transition, the central throttle is in control of the cylinder air charge. The cylinder air charge is largely unaffected by the port throttle position.

Thus, FIG. 4 represents a change from a higher BMEP engine operating condition to a lower BMEP engine operating condition where the central and port throttles are controlled in a first mode at the higher BMEP and where the central and port throttles are controlled in a second mode at the lower BMEP. FIG. 4 also includes a BMEP change request from a lower BMEP to a higher BMEP. The port throttle and the central throttle are controlled in response to the intake manifold pressure before time $T_1$. In particular, since during the conditions before time $T_1$ intake manifold pressure is high, and because intake manifold pressure cannot be reduced immediately since intake manifold volume is rather large, the port throttle opening amount is reduced to provide the desired cylinder air charge during the transition at time $T_1$. The central throttle controls cylinder air charge during the transition at time $T_3$. Thus, depending on the initial intake manifold pressure and the desired BMEP, the port throttle or the central throttle may control cylinder air charge during a change from a first throttle control mode to a second throttle control mode.

Referring now to FIG. 5, a simulated example of another engine operating sequence is shown. The sequence of FIG. 5 may be provided by the system of FIG. 1 executing the method of FIG. 6. Vertical markers at time $T_1$-$T_3$ provide reference points to events of interest in the sequence.

The first plot from the top of FIG. 5 represents a desired BMEP. The desired BMEP may be provided by a driver input (e.g., accelerator pedal) or from another controller. The Y-axis represents desired BMEP and desired BMEP increases in the direction of the Y-axis arrow. The X-axis represents time and time increases from the left side of the plot to the right side of the plot.

The second plot from the top of FIG. 5 represents central throttle opening amount versus time. The Y-axis represents central throttle opening amount and central throttle opening amount increases in the direction of the Y-axis arrow. The X-axis represents time and time increases from the left side of the plot to the right side of the plot.

The third plot from the top of FIG. 5 represents port throttle opening amount versus time. The Y-axis represents port throttle opening amount and port throttle opening amount increases in the direction of the Y-axis arrow. The X-axis represents time and time increases from the left side of the plot to the right side of the plot.

The fourth plot from the top of FIG. 5 represents engine intake manifold absolute pressure versus time. The Y-axis represents engine intake manifold absolute pressure and engine intake manifold pressure increases in the direction of the Y-axis arrow. The X-axis represents time and time increases from the left side of the plot to the right side of the plot.

The fifth plot from the top of FIG. 5 represents intake port absolute pressure. The Y-axis represents intake port absolute pressure and intake port absolute pressure increases in the direction of the Y-axis arrow. The X-axis represents time and time increases from the left side of the plot to the right side of the plot.

At time $T_0$, the engine is operated in a first throttle control mode where BMEP is controlled via the central throttle (e.g., region C of FIG. 2; central throttle in control of cylinder air charge). A higher pressure drop occurs across the central throttle than the port throttle since the port throttle is substantially fully open (e.g., greater than 90% open). In this throttle mode, the central throttle opening amount may be increased to increase cylinder air charge (e.g., the amount of air entering a cylinder during a cycle of the cylinder) or decreased to decrease cylinder air charge. The port throttle is positioned to have no effect on cylinder air charge. Intake manifold pressure is at a relatively high value since the central throttle is opened to a larger amount. Likewise, intake port pressure is at a higher value and substantially follows intake manifold pressure since very little pressure drop occurs across the port throttle.

At time $T_1$, the central throttle opening area is increased in response to the reduction in desired BMEP. The engine is transitioned from a first throttle control mode to a second throttle control mode. The central throttle opening area is increased to allow additional air to flow into the intake manifold. Opening the central throttle reduces the pressure drop across the central throttle. The port throttle position is decreased to reduce the cylinder air amount and provide the desired air amount for the requested BMEP. Thus, although the intake manifold pressure is increased, the intake port pressure is decreased and the cylinder air charge is reduced. The port throttle opening amount is reduced in response to intake manifold pressure being at a level that will provide a higher BMEP than is desired if the intake port pressure were to remain at the intake manifold pressure. The central throttle is opened to reduce engine pumping losses and improve engine efficiency. The engine is operated in Region B of FIG. 2 between time $T_1$ and time $T_2$. Thus, the engine is transitioned from a higher BMEP to a medium BMEP. The intake manifold pressure is increased at time $T_1$ when the central throttle opening amount is increased. The intake port pressure is reduced as the port throttle limits air flow into the cylinder. The central throttle pressure drop is greater than the port throttle pressure drop before time $T_1$. The central throttle pressure drop is less than the port throttle pressure drop after time $T_1$ and before time $T_2$. The port throttle controls cylinder air charge during and after the throttle mode transition at time $T_1$ up to time $T_2$.

At time $T_2$, the desired BMEP is increased to a higher level and the engine reenters the first throttle control mode (e.g., Region C of FIG. 2) from the second throttle control mode. The central throttle position is decreased to a level that will provide the desired cylinder air charge at the desired BMEP. Further, the central throttle opening amount is reduced to an amount that is less than the central throttle opening amount that provides the desired steady state BMEP that initiates the throttle mode change. In other words, the central throttle opening amount adjustment overshoots the steady state central throttle opening amount. The central throttle opening amount is made smaller to decrease intake manifold pressure to a level where the desired BMEP is provided when an intake valve of the cylinder closes with pressure in the cylinder at intake manifold pressure. Air pressure within the intake manifold can be reduced at a faster rate when the central throttle position overshoots (e.g., in these conditions closes more than the steady state throttle opening amount) the steady state throttle position that provides the desired BMEP.

The port throttle position is also adjusted at time $T_2$ such that the desired cylinder air charge is provided as the intake manifold pressure is reduced. In particular, the port throttle opening amount is increased as the intake manifold pressure decreases so that the desired cylinder air charge is provided even in the presence of lowering intake manifold pressure. The intake manifold pressure decreases as the central throttle opening amount is reduced. The intake port pressure is adjusted to provide the desired cylinder air charge at the desired BMEP. In particular, the port throttle is adjusted to provide a desired intake port pressure during the throttle mode transition at time $T_2$.

At time $T_3$, the intake manifold pressure is reduced to a level that will provide the desired steady state BMEP at the cylinder air charge provided when the cylinder intake valve closes and the cylinder pressure is substantially at intake manifold pressure (e.g., ±0.069 bar). Also, the port throttle opening amount is increased so that the port throttle is held substantially fully open (e.g., 90% or more open). Opening the port throttle allows pressure in the intake port to approach intake manifold pressure. The intake port pressure increases to the intake manifold pressure when the port throttles are opened.

Thus, the sequence of FIG. 5 provides for changing throttle modes when transitioning from a higher BMEP where the central throttle controls cylinder air charge to a medium BMEP where the port throttle controls cylinder air charge. Further, the sequence of FIG. 5 illustrates a throttle mode transition from a medium BMEP where the port throttle controls cylinder air charge to a higher BMEP where the central throttle controls cylinder air charge. The pressure drop across the central throttle is greater than the pressure drop across the port throttle when the central throttle controls cylinder air charge. The pressure drop across the port throttle is greater than the pressure drop across the central throttle when the port throttle controls cylinder air charge.

Figure 6:
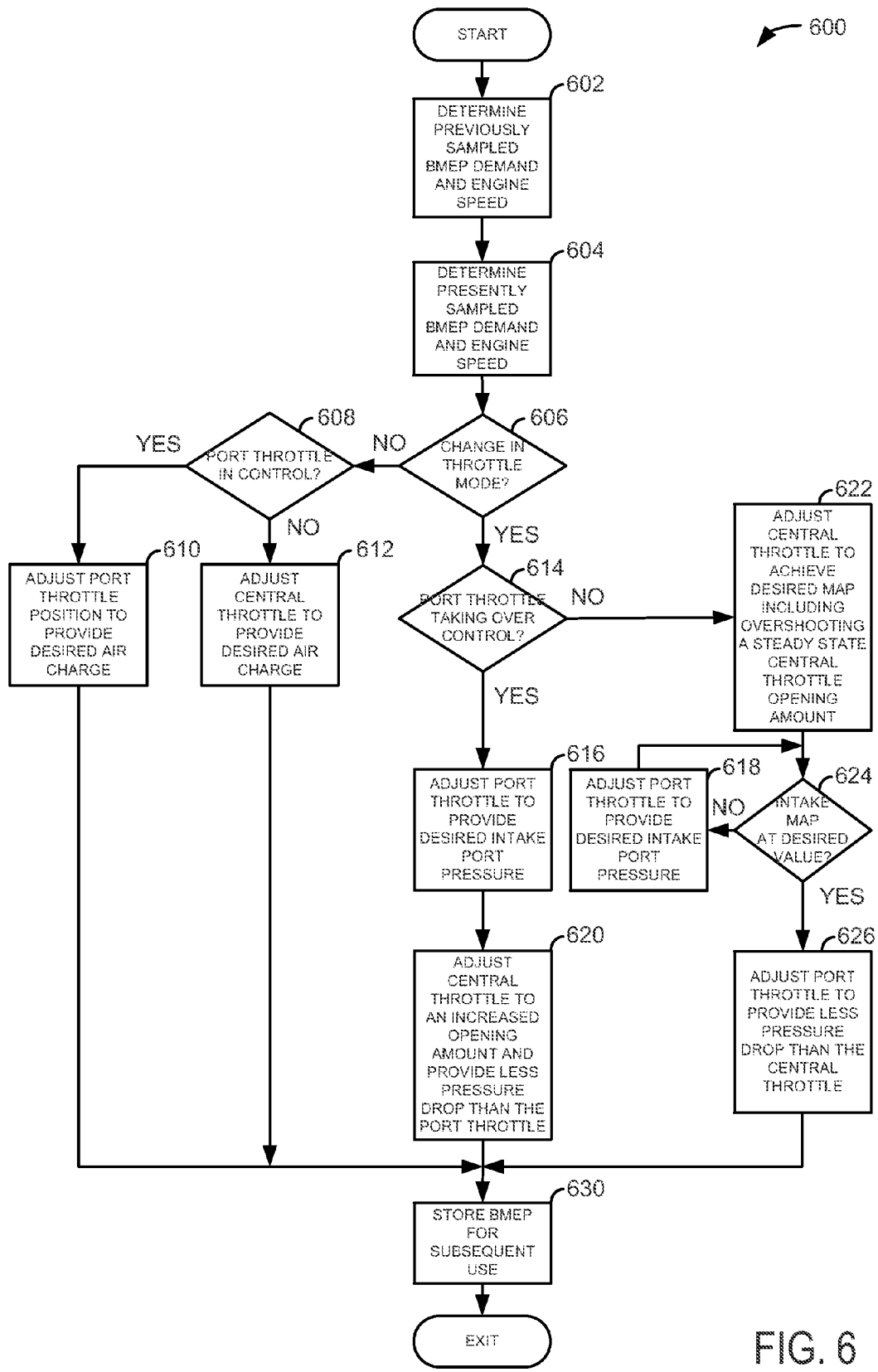
FIG. 6 shows a flowchart of an example method for operating an engine.

Referring now to FIG. 6, a flowchart of an example method for operating an engine is shown. The flowchart of FIG. 6 may be stored in non-transitory memory of controller 12 shown in FIG. 1 as executable instructions. The method of FIG. 6 may provide the sequences illustrated in FIGS. 3-5.

At 602, method 600 determines the previously sampled BMEP demand and engine speed. The BMEP demand may originate from an accelerator pedal or another controller. The previously sampled BMEP may be retrieved from memory where it was stored the previous time that method 600 executed. Engine speed may be determined from an engine position sensor and stored in memory. Method 600 proceeds to 604 after the last or previously sampled BMEP is determined.

At 604, method 600 determines the present BMEP demand and engine speed. The BMEP may be determined via an input from a sensor or a controller. The engine speed may be determined from an engine position sensor (e.g., 118 of FIG. 1). Method 600 proceeds to 606 after the present engine BMEP and speed are determined.

At 606, method 600 judges whether or not a change in throttle mode is being requested. In one example, a change in throttle mode is determined based on a difference between the present throttle mode based on BMEP and engine speed, and the throttle mode provided in response to the last BMEP and engine speed. A change in throttle mode may be determined when the BMEP and/or engine speed change such that it is desirable to transition from a first throttle control mode to a second throttle control mode. In one example, engine throttle modes are selected in response to a mapping of throttle control modes as shown in FIG. 2. In particular, one of three throttle control modes may be selected as the engine operating conditions move between Regions A, B, and C shown in FIG. 2. Thus, a change in BMEP and/or engine speed may be a basis for changing from a first throttle control mode to a second throttle control mode. If a change in throttle control mode is requested, the answer is yes and method 600 proceeds to 614. Otherwise, method 600 proceeds to 608.

At 608, method 600 judges whether or not the port throttle (e.g., element 83 of FIG. 1) is in control. In one example, the port throttle is judged to be in control when the engine operates in a mode according to an engine map where the port throttle has a larger pressure drop than the central throttle (e.g., Region B in FIG. 2). If method 600 judges that the port throttle is in control, the answer is yes and method 600 proceeds to 610. Otherwise, method 600 proceeds to 612.

At 610, method 600 adjusts the port throttle opening amount or position to provide the desired cylinder air charge. In one example, the desired cylinder air charge is provided via controlling intake port pressure to a value that provides the desired cylinder air charge. The intake port pressure may be decreased via decreasing the port throttle opening amount. The intake port pressure may be increased via increasing the port throttle opening amount. In one example, the intake port pressure is adjusted to a level based on the ideal gas law to provide the desired cylinder air charge. In particular, desired BMEP or torque is converted into a desired fuel amount, and the desired fuel amount is converted to a desired cylinder air amount, which is converted to an intake port pressure. In one example, the BMEP or torque may be converted to a cylinder air charge and intake port pressure as described in U.S. Pat. No. 7,213,548 which is hereby fully incorporated for all intents and purposes. Method 600 proceeds to 630 after intake port pressure is adjusted. The central throttle is adjusted to provide less pressure drop than the port throttle when the port throttle is in control.

At 630, method 600 stores a BMEP or torque request determined during the present execution of method 600 to memory for subsequent retrieval at 602 when method 600 is executed again. In one example, the BMEP request determined during the present execution of method 600 is stored to a location in RAM and then method 600 exits.

At 612, method 600 adjusts the central throttle opening amount or position to provide the desired cylinder air charge. In one example, the desired cylinder air charge is provided via controlling intake manifold pressure to a value that provides the desired cylinder air charge. The intake manifold pressure may be decreased via decreasing the central throttle opening amount. The intake manifold pressure may be increased via increasing the central throttle opening amount. In one example, the intake manifold pressure is adjusted to a level based on the ideal gas law to provide the desired cylinder air charge. In particular, desired BMEP or torque is converted into a desired fuel amount, and the desired fuel amount is converted to a desired cylinder air amount, which is converted to an intake manifold pressure. In one example, the BMEP or torque may be converted to a cylinder air charge and intake manifold pressure as described in U.S. Pat. No. 7,213,548 which is hereby fully incorporated for all intents and purposes. Method 600 proceeds to 630 after intake manifold pressure is adjusted. The port throttles are adjusted to provide less pressure drop than the central throttle when the central throttle is in control.

At 614, method 600 judges whether or not the port throttle is taking over control from the central throttle. In one example, the port throttle may be judged to taking over control when the engine is moving to a region of the engine map where the port throttle has a larger pressure drop than the central throttle. If method 600 judges that the port throttle is taking over control, the answer is yes and method 600 proceeds to 616. Otherwise, the answer is no and method 600 proceeds to 622.

At 622, method 600 adjusts an opening amount or a position of the central throttle to provide a desired intake manifold pressure (MAP) including overshooting a steady state central throttle opening amount that provides the desired BMEP. For example, the amount of overshoot may be adjusted based on the initial intake MAP and the intake MAP for the desired BMEP. In one example, the amount of overshoot is increased as the difference in pressure between the last BMEP and the present BMEP increases. The desired intake MAP is based on the desired BMEP. Examples of overshooting the steady state central throttle opening amount are shown in FIGS. 4 and 5 at times $T_3$ and $T_2$, respectively. It should be mentioned that overshoot may occur in the central throttle opening or closing direction and the central throttle opening amount may be increased or decreased depending on the new throttle mode that is selected based on the BMEP and engine speed determined at 604. Method 600 proceeds to 624 after the opening amount of the central throttle is adjusted.

At 624, method 600 judges whether or not the intake MAP is at the desired value corresponding to the latest BMEP request. If the intake MAP is at the desired level, the answer is yes and method 600 proceeds to 626. Otherwise, the answer is no and method 600 proceeds to 618.

At 618, method 600 adjusts the port throttle opening amount to provide the desired cylinder air charge as determined from the presently sampled BMEP request. In one example, the port throttle opening amount is adjusted to provide a desired intake port pressure that is based on the presently sampled request BMEP according to the ideal gas law and as is described in U.S. Pat. No. 7,213,548 while the intake MAP is not at the desired MAP. Thus, while the intake manifold pressure is higher or lower than desired MAP, the port throttle is adjusted to provide the desired cylinder air amount. Further, the port throttle opening amount is adjusted responsive to intake MAP when the throttle mode transition is initiated. For example, if the intake MAP at the previously sampled BMEP is higher than the intake MAP for the presently sampled BMEP, the port throttle opening amount is reduced to provide the desired cylinder air charge and BMEP. On the other hand, if the intake MAP at the previously sampled BMEP is lower than the intake MAP for the presently sampled BMEP, the port throttle opening amount is increased to provide the desired cylinder air charge and BMEP. Method 600 returns to 624 after the port throttle opening amount is adjusted.

At 626, method 600 adjusts the port throttle to provide less pressure drop than the cylinder central throttle. In some examples, the port throttle is adjusted to a fully open position after the intake MAP reaches the desired level. Method 600 proceeds to 630 after the port throttle is adjusted to put the central throttle in control of cylinder air charge.

Thus, during a throttle mode change where the throttles are controlled to put the central throttle in control of cylinder air charge, the port throttle opening amount may be adjusted to provide the desired cylinder air charge while the central throttle directs the intake map to a lower or higher value.

At 616, method 600 adjusts the port throttle opening amount to provide the desired intake port pressure. In particular, the port throttle opening amount is adjusted to provide a desired intake port pressure which is based on the desired BMEP determined at 604. Further, the port throttle position may be adjusted based on the previously sampled intake MAP before the presently sampled BMEP request. For example, if the previously sampled intake MAP is higher than the desired intake port pressure, the port throttle may be closed based on the value of the previously sampled intake MAP. If the previously sampled intake MAP is lower than desired intake port pressure, the port throttle may be opened based on the value of the previously sampled intake MAP. The desired intake port pressure may be determined according to the method described in U.S. Pat. No. 7,213,548. The port throttle opening amount may be decreased to decrease cylinder air charge or increased to increase cylinder air charge. Method 600 proceeds to 620 after the port throttle position is adjusted.

At 620, method 600 adjusts the central throttle position to increase the central throttle opening amount so that there is less pressure drop across the central throttle than the port throttle. In some examples, the central throttle is adjusted to a fully open position in response to transitioning from a throttle control mode where the central throttle is in control to a throttle control mode where the port throttle is in control. Method 600 proceeds to 630 after the central throttle is adjusted to put the port throttle in control of cylinder air charge.

Thus, the method of FIG. 6 provides for an engine operating method, comprising: providing a transition from a first throttle control mode to a second throttle control mode in response to a change in engine operating conditions; and adjusting intake manifold pressure via a first throttle responsive to a desired cylinder air charge in the first throttle control mode and adjusting intake port pressure via a second throttle responsive to the desired cylinder air charge in the second throttle control mode. In this way, the intake port pressure is adjusted via the second throttle to provide the desired cylinder air charge. Alternatively, the central throttle adjusts the intake MAP to provide the desired cylinder air charge when the other throttle is moved to a full open position.

The engine operating method includes where the first throttle control mode and the second throttle control mode include a central throttle and a port throttle. In one example, the engine operating method further comprises adjusting intake port pressure via the port throttle when intake manifold pressure is greater than desired to provide a desired cylinder air charge. The engine operating method includes where the central throttle is closed during the transition by more than a steady state central throttle opening amount after the transition, where the steady state central throttle opening amount is based on a BMEP request that initiated the transition from the first throttle control mode to the second throttle control mode. The engine operating method further comprises closing the central throttle body to the steady state central throttle opening amount in response to the intake manifold absolute pressure reaching a desired pressure level.

In another example, the engine operating method further comprises adjusting the central throttle independent of the port throttle. The engine operating method includes where the intake port pressure is at a location downstream of a first throttle and a second throttle, the second throttle positioned in an intake port. The engine operating method includes where the intake port pressure is adjusted during the transition in response to a desired cylinder air charge.

The method of FIG. 6 also provides for an engine operating method, comprising: providing a first transition from a first throttle control mode to a second throttle control mode in response to a first engine operating condition; providing a second transition from the second throttle control mode to the first throttle control mode in response to a second engine operating condition; adjusting a first throttle and providing less pressure drop across the first throttle than a second throttle during the first transition; and adjusting the second throttle to provide less pressure drop across the second throttle than the first throttle during the second transition.

The engine operating method includes where the second throttle is a port throttle, and where the second transition is from a lower BMEP to a higher BMEP. The engine operating method also includes where the first throttle is a central throttle, and where the first transition is from a higher BMEP to a lower BMEP. The engine operating method includes where the second throttle is adjusted to provide a desired intake port pressure while the first throttle is adjusted to provide less pressure drop than the second throttle. The engine operating method further comprises adjusting the first throttle and the second throttle during the first transition in response to intake manifold pressure before the first transition. The engine operating method further comprises adjusting the first throttle and the second throttle during the second transition in response to intake manifold pressure before the second transition.

The method of FIG. 6 also provides for an engine operating method, comprising: providing a transition from a first throttle control mode at a first BMEP where a first throttle provides a greater pressure drop than a second throttle to a second throttle control mode at a second BMEP where the first throttle provides a greater pressure drop than the second throttle in response to a BMEP request; and adjusting intake port absolute pressure according to a desired cylinder air charge during the transition from the first throttle control mode to the second throttle control mode. The engine operating method includes where the first throttle is a central throttle and where the second throttle is a port throttle.

The method of FIG. 6 also provides for an engine operating method further comprising opening the port throttle after intake manifold pressure reaches a desired pressure. The engine operating method further comprises closing the first throttle to a greater extent during the transition than after the BMEP request is provided in the second throttle control mode. The engine operating method also includes where the first BMEP is greater than the second BMEP. The engine operating method includes where the second throttle is closed to a first opening amount at the beginning of the transition and opened during the transition as intake manifold pressure decreases.

As will be appreciated by one of ordinary skill in the art, the method described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating on natural gas, gasoline, diesel, or alternative fuel configurations could use the present description to advantage.

The invention claimed is:

1. An engine operating method via an electronic controller in combination with an engine of a vehicle including a central throttle and a poll throttle, the vehicle driven by a driver, comprising:

adjusting an intake manifold pressure via the central throttle responsive to a desired cylinder air charge in a first throttle control mode and adjusting an intake port pressure via the port throttle responsive to the desired cylinder air charge in a second throttle control mode; and operating the engine in the first throttle control mode at a first steady state BMEP and transitioning to operating the engine in the second throttle control mode at a second steady state BMEP in response to engine operating condition changes, where the central throttle is closed during the transition by more than the central throttle is open in the first throttle control mode and the second throttle control mode, where a steady state central throttle opening amount is determined by the controller based on a BMEP or torque request by the driver via an accelerator pedal sending a signal to the controller, the controller initiating the transition from the first throttle control mode to the second throttle control mode in response to the BMEP or torque request.

2. The engine operating method of claim 1, further comprising opening the central throttle and closing the port throttle in response to transitioning from the second steady state BMEP to the first steady state BMEP, the second steady state BMEP greater than the first steady state BMEP.

3. The engine operating method of claim 1, further comprising adjusting the intake port pressure via the port throttle when the intake manifold pressure is greater than desired to provide the desired cylinder air charge.

4. The engine operating method of claim 3, further comprising opening the port throttle in response to the intake manifold pressure reaching a desired pressure level.

5. The engine operating method of claim 1, further comprising adjusting the central throttle independent of the port throttle.

6. The engine operating method of claim 1, where the intake port pressure is at a location downstream of the central throttle and the port throttle, the port throttle positioned in an intake port.

7. The engine operating method of claim 1, where the intake port pressure is adjusted during the transition in response to the desired cylinder air charge.

8. An engine operating method via an electronic controller in combination with an engine of a vehicle including a first throttle and a second throttle, the vehicle driven by a driver, comprising:
adjusting an intake manifold pressure via the first throttle responsive to a desired cylinder air charge in a first throttle control mode and adjusting an intake port pressure via the second throttle responsive to the desired cylinder air charge in a second throttle control mode; and
transitioning from operating the engine with the first throttle control mode to operating the engine with the second throttle control mode by opening the first throttle at a same time as closing the second throttle in response to an increase in driver requested torque by the driver via an accelerator pedal sending a signal to the controller, and where the first throttle is opened during the transition by more than an amount the first throttle is opened in the first throttle control mode at a time of the increase in driver requested torque and by more than an amount the first throttle is opened in the second throttle control mode immediately following the transition.

9. The method of claim 8, wherein intake manifold pressure is increased at the same time as when the first throttle is opening and wherein intake port pressure is reduced as the second throttle is closing.

10. The method of claim 9, wherein pressure drop across the first throttle is greater than pressure drop across the second throttle before the same time and wherein pressure drop across the first throttle is less than pressure drop across the second throttle after the same time.

11. The method of claim 10, where the first throttle is a central throttle and the second throttle is a port throttle.

12. The method of claim 8, further comprising, at another time, operating the engine in the second throttle control mode at a first steady state BMEP and transitioning to operating the engine in the first throttle control mode at a second steady state BMEP in response to an increase in driver requested torque by the driver via the accelerator pedal sending the signal to the controller, where the first throttle is a central throttle, and where the central throttle is opened during the transition by an amount more than the central throttle is open in the first throttle control mode and the second throttle control mode.

* * * * *